United States Patent [19]

Gay

[11] Patent Number: 5,070,128

[45] Date of Patent: Dec. 3, 1991

[54] HEAT-STABILIZED/NON-YELLOWING CHLOROPOLYMERS

[75] Inventor: Michel Gay, Villeurbanne, France

[73] Assignee: Rhone-Poulenc Chimie, Courbevoie, France

[21] Appl. No.: 504,301

[22] Filed: Apr. 4, 1990

[30] Foreign Application Priority Data

Apr. 4, 1989 [FR] France ................... 89 04652

[51] Int. Cl.$^5$ .................. C08K 5/526; C08K 5/15; C08K 5/09
[52] U.S. Cl. .................... 524/357; 524/114; 524/147; 524/151; 524/399; 524/400
[58] Field of Search ............... 524/357, 399, 400, 114, 524/147, 151

[56] References Cited

U.S. PATENT DOCUMENTS

| | | | |
|---|---|---|---|
| 4,427,816 | 1/1984 | Aoki et al. | 524/357 |
| 4,751,261 | 6/1988 | Miyata et al. | 524/357 |
| 4,950,704 | 8/1990 | Croce et al. | 524/357 |

FOREIGN PATENT DOCUMENTS

| | | |
|---|---|---|
| 0005678 | 11/1979 | European Pat. Off. . |
| 0256872 | 2/1988 | European Pat. Off. . |
| 2915439 | 10/1979 | Fed. Rep. of Germany . |
| 53-9847 | 1/1978 | Japan . |
| 54-56645 | 5/1979 | Japan . |
| 57-150 | 1/1982 | Japan . |
| 57-39260 | 8/1982 | Japan . |
| 57-151635 | 9/1982 | Japan . |
| 59-217746 | 12/1984 | Japan . |

OTHER PUBLICATIONS

Patent Abstracts of Japan, vol. 6, No. 257 (C-140) [1135], Dec. 16, 1982.
Chemical Abstracts, vol. 98, 1982, p. 41., Resume No. 108345d.

*Primary Examiner*—Veronica P. Hoke
*Attorney, Agent, or Firm*—Burns, Doane, Swecker & Mathis

[57] ABSTRACT

Heat-stabilized, non-yellowing chlorinated polymers having extended working ranges, notably PVC polymers and copolymers, contain effective stabilizing amounts of (a) at least one organozinc compound, (b) at least one organic calcium, barium, magnesium or strontium compound, and (c) at least one sodium $\beta$-diketonate.

21 Claims, No Drawings

HEAT-STABILIZED/NON-YELLOWING CHLOROPOLYMERS

BACKGROUND OF THE INVENTION

1. Field of the Invention

The present invention relates to the stabilization of halogenated polymers, notably PVC, PVDC and mixtures and copolymers thereof, and to the halogenated polymer compositions thus stabilized.

2. Description of the Prior Art more particularly, of chlorinated polymers, using zinc or cadmium salts in combination with salts of metals of Group IIa of the Periodic Table of the elements has long been known to this art. However, this stabilization has been found to be insufficient in the case of applications requiring good resistance to yellowing.

To improve such yellowing resistance, it has been proposed to the art to add secondary organic stabilizers to the aforesaid primary stabilizers.

β-Diketones and β-ketoaldehydes are particularly effective among the former additives. They permit the formulation of compositions which are colorless and whose color exhibits practically no change during their processing. This is the reason that their use is very widespread in applications such as the production of polyvinyl chloride bottles.

However, it is sometimes necessary to recycle chlorinated polymers, and this increases the total duration of the heat treatment to which they are subjected.

Moreover, during the processing of chlorinated polymer compounds, whether by accident or as a result of poor programming of the heating cycle, it is not uncommon that the polymer is subjected to a higher temperature or to a longer period of heat treatment than normally.

Thus, substantial need exists in the chlorinated polymer processing art for an extended working range, namely, a heating time during which the initial color undergoes very little or no change, which is longer than presently available, while maintaining the benefit of the colorless and transparent nature imparted by the β-diketones.

Various solutions have been proposed to the art to accomplish these results.

Thus, published French Patent Application FR-A-2,356,674 describes the addition of a polyol which makes it possible, in particular, to lengthen the blackening resistance, sometimes designated "long-term resistance", and, to a lesser extent, to lengthen the working range of the polymer However, the addition of a polyol does not enable the working range to be sufficiently improved for all compositions, and especially in compositions which, for example, contain less than 0.5% of zinc compounds.

It is also very common to introduce epoxidized oils into chlorinated polymer compositions, such as epoxidized soya oil, which also promotes a lengthening of the working range of the polymer when heated.

However, a disadvantage of these epoxy compounds, especially of epoxidized soya oil, which is very widely used, is that they lower the softening point of the polymer, in particular when large amounts are employed. The amount of these adjuvants must therefore be reduced, while at the same time maintaining the beneficial effect which they provide.

SUMMARY OF THE INVENTION

Accordingly, a major object of the present invention is the provision of improved chlorinated polymer compositions having lengthened working ranges when heated, particularly the so-called rigid or semirigid chlorinated polymer compositions, and which improved compositions conspicuously ameliorate the above disadvantages and drawbacks to date characterizing the state of this art.

Briefly, the present invention features compositions based on chlorinated polymers which comprise (a) an effective stabilizing amount of at least one organic zinc compound, (b) an effective stabilizing amount of at least one organic calcium, barium, magnesium or strontium compound, and (c) an effective stabilizing amount of at least one sodium β-diketonate.

DETAILED DESCRIPTION OF THE PREFERRED EMBODIMENTS OF THE INVENTION

More particularly according to the present invention, the chlorinated polymers to be stabilized are especially polyvinyl chloride (PVC), polyvinylidene chloride (PVDC), copolymers predominantly comprised of vinyl chloride recurring units prepared from vinyl chloride and other monomers, and mixtures of polymers or copolymers, the major recurring structural unit of which is vinyl chloride.

In general, any type of PVC is suitable, whatever its method of preparation: bulk, suspension or dispersion, or any other type of polymerization, and whatever its intrinsic viscosity.

The vinyl chloride homopolymers may also be modified chemically, for example by chlorination.

Many vinyl chloride copolymers can also be stabilized against the effects of heat, namely, yellowing and degradation. They are, in particular, the copolymers prepared by copolymerization of vinyl chloride with other polymerizable ethylenically unsaturated comonomers, such as, for example, vinyl acetate or vinylidene chloride, maleic or fumaric acids or their esters, olefins such as ethylene propylene or hexene, acrylic or methacrylic esters, styrene, and vinyl ethers such as vinyl dodecyl ether.

These copolymers usually contain at least 50% by weight of vinyl chloride units and preferably at least 80% by weight of vinyl chloride units.

The compositions according to the invention may also comprise mixtures based on chlorinated polymers containing minor quantities of other polymers, such as halogenated polyolefins or acrylonitrile-butadiene-styrene copolymers.

PVC by itself, or mixed with other polymers, is the most preferred chlorinated polymer comprising the compositions of the invention.

The organozinc compounds are preferably zinc carboxylates and phenolates.

Particularly representative are, for example, the zinc salts of maleic, acetic, diacetic, propionic, hexanoic, 2-ethylhexanoic, decanoic, undecanoic, lauric, myristic, palmitic, stearic, oleic, ricinoleic, behenic, hydroxy stearic, hydroxyundecanoic, benzoic, phenylacetic, para-tert-butylbenzoic and salicylic acids and zinc phenolates of phenol and of phenols substituted by one or more alkyl radicals, such as nonylphenols.

Among the organic zinc compounds mentioned above, the most preferred (for practical reasons or for economic reasons) are zinc propionate, zinc 2-ethylhexanoate, zinc laurate, zinc stearate, zinc oleate, zinc ricinoleate, zinc benzoate, zinc para-tert-butylbenzoate, zinc salicylate, zinc mono(2-ethylhexyl) maleate and zinc nonylphenates.

The organic zinc compounds generally constitute from 0.005% to 1% by weight, and preferably from 0.01% to 0.6% by weight, relative to the chlorinated polymer.

The organic calcium, barium, magnesium and strontium compounds are preferably the carboxylates and the phenolates of these metals.

Those particularly representative are, for example, the calcium, barium, magnesium and strontium salts of maleic, acetic, diacetic, propionic, hexanoic, 2-ethylhexanoic, decanoic, undecanoic, lauric, myristic, palmitic, stearic, oleic, ricinoleic, behenic, hydroxystearic, hydroxyundecanoic, benzoic, phenylacetic, para-tert-butylbenzoic and salicylic acids, and calcium, barium, magnesium and strontium phenolates of phenol and of phenols substituted by one or more alkyl radicals, such as nonylphenols.

Among the organic calcium, barium, magnesium and strontium compounds mentioned above, the most preferred, for practical or economic reasons, are the calcium, barium and magnesium salts of propionic, 2-ethylhexanoic, lauric, stearic, oleic, ricinoleic, benzoic, para-tert-butylbenzoic and salicylic acids, mono(2-ethylhexyl) maleate, and calcium, barium and magnesium nonylphenates.

The organic calcium, barium, magnesium and strontium compounds generally constitute from 0.005% to 5% by weight, and preferably from 0.02% to 2% by weight, relative to the chlorinated polymer.

For food-contact applications and especially for PVC bottles, organic calcium compounds or mixtures of organic calcium compounds and organic magnesium compounds will be employed.

The sodium β-diketonates which comprise the compositions of the present invention are all sodium derivatives of aromatic, arylaliphatic, aliphatic or cyclic β-diketones and β-ketoaldehydes.

Particularly representative are the sodium derivatives of the compounds described in French Patents or Certificates of Addition published under Numbers FR 2,292,227, FR 2,324,681, FR 2,351,149, FR 2,352,025, FR 2,383,988 and FR 2,456,132 and in European Patents EP 0,040,286 and EP 0,046,161.

Exemplary of such sodium β-diketonates are the sodium derivatives of benzoylstearoylmethane, of dibenzoylmethane, of benzoylacetone, of benzoyl-3-methylbutanoylmethane, of methoxycarbonylbenzoylbenzoylmethanes, and of bis-β-diketones such as 1,4-bis(acetylaceto)butane, 1,8-bis(benzoylaceto)octane and 1,4-bis(acetylaceto)benzene.

The compositions according to the invention typically contain from 0.005% to 5% by weight of sodium β-diketonate relative to the chlorinated polymer. They preferably contain from 0.01% to 2% by weight of sodium β-diketonate relative to the chlorinated polymer.

Among the metal derivatives, salts or chelates of β-diketones which are referred to indiscriminately in the prior art, the sodium β-diketonates offer this advantageous particular feature of lengthening the working range of the chlorinated polymers without, however, having a detrimental effect on the initial transparency and colorless nature of the said polymers.

In addition to the sodium β-diketonate, the compositions may also contain a β-diketone. The latter may be the β-diketone corresponding to the sodium β-diketonate of the composition or may be different. The total amount of sodium β-diketonate and of β-diketone in the composition is generally equal to the amounts indicated above for the sodium β-diketonate by itself.

The compositions of the invention may also contain other secondary heat stabilizers, such as polyols, phosphites or epoxy compounds.

The polyols generally have the advantage of lengthening the lifetime of chlorinated polymers subjected to a heat treatment.

It is generally preferable that the polyols employed should have a boiling point above 150° C. and preferably above 170° C., because of the use of chlorinated polymers at elevated temperatures.

Exemplary of such polyols are the triols such as trimethylolpropane, glycerol, 1,2,6-hexanetriol, 1,2,4-butanetriol or trishydroxyethyl isocyanurate, tetrols such as pentaerythritol or diglycerol, pentitols such as xylitol or tetramethylolcyclohexanol, hexitols such as mannitol, sorbitol or dipentaerythritol, polyols partially esterified with a carboxylic acid and in whose formula at least 3 hydroxyl functional groups are free, polyvinyl alcohols, especially those in which there remains less than 30 mol % of ester groups relative to their total ester and hydroxyl groups and which have a viscosity ranging from approximately $4 \times 10^{-3}$ Pa.s to $60 \times 10^{-3}$ Pa.s at 20° C. in an aqueous solution at a concentration of 4% by weight.

Among such polyols, those preferred are xylitol, mannitol, sorbitol, tetramethylolcyclohexanol and the polyvinyl alcohols described above.

When it is present in the compositions according to the invention, from 0.005% to 1% by weight, and preferably from 0.01% to 0.6% by weight of polyol is generally employed, relative to the chlorinated polymer.

The epoxides which may be employed in the compositions according to the invention are generally complex compounds, usually epoxidized polyglycerides, such as epoxidized soya oil, which is that most commonly employed, epoxidized linseed oil, epoxidized fish oils and epoxidized tall oil.

The compositions according to the invention may also contain organic phosphites, especially trialkyl or alkyl phenyl or triphenyl phosphites.

Preferably, such organophosphites are selected from among:

Pentaerythrityl dialkyl diphosphite;
Pentaerythrityl diphenyl diphosphite;
Pentaerythrityl bis(2,4-di-tert-butylphenyl) diphosphite;
Tetraalkyl bis(1,4-phenylene)dimethylmethane diphosphite;
Tetraalkyl bis(2,5-dialkyl-1,4-phenylene)alkylmethane diphosphite;
Diphenyl bis[2-(2-butoxyethoxy)ethyl]-4,4'-isopropylidenediphenyl diphosphite;
Tetrakis[2-(2-butoxyethoxy)ethyl]-4,4'-isopropylidenediphenyl diphosphite;
Diphenyl tris[2-(2-butoxyethoxy)ethyl] bis(4,4'-isopropylidenediphenyl) triphosphite;
Diphenyl tetrakis[2-(2-butoxyethoxy)ethyl] tris(4,4'-isopropylidenediphenyl) tetraphosphite;
Diphenyl bis[2-(2-butoxyethoxy)ethyl]-4,4'-isopropylidenediphenyl diphosphite;

Tetrakis[2-(2-butoxyethoxy)ethyl]-4,4'-isopropylidenediphenyl diphosphite;
Diphenyl tris[2-(2-butoxyethoxy)ethyl] bis(4,4'-isopropylidenediphenyl) triphosphite;
Diphenyl tetrakis[2-(2-butoxyethoxy)ethyl] tris(4,4'-isopropylidenediphenyl) tetraphosphite;
Diphenyl pentakis[2-(2-butoxyethoxy)ethyl] tetrakis-(4,4'-isopropylidenediphenyl) pentaphosphite;
Diphenyl hexakis[2-(2-butoxyethoxy)ethyl] pentakis-(4,4'-isopropylidenediphenyl) hexaphosphite;
Pentakis[2-(2-butoxyethoxy)ethyl] bis(4,4'-isopropylidenediphenyl) triphosphite;
Hexakis[2-(2-butoxyethoxy)ethyl] tris(4,4'-isopropylidenediphenyl) tetraphosphite;
Bis(2,4-di-tert-butylphenyl) bis[2-(2-butoxyethoxy)ethyl] 4,4'-isopropylidenediphenyl diphosphite;
Bis(2,6-di-tert-butylphenyl) bis[2-(2-butoxyethoxy)ethyl] 4,4'-isopropylidenediphenyl diphosphite.

When it is present, the phosphite generally constitutes from 0.05% to 5% by weight, and preferably from 0.1% to 2% by weight, relative to the chlorinated polymer.

The compositions according to the invention may also contain the usual adjuvants and additives such as phenolic antioxidants, anti-UV agents such as benzophenones, benzotriazoles or sterically hindered amines (typically designated as HALS).

As indicated above, the compositions of the invention which are more particularly advantageous are the rigid, namely, plasticizer-free, or semirigid formulations, namely, those with reduced plasticizer contents. Indeed, one of the applications to which these compositions are particularly suited, is the preparation of bottles, especially for water. However, the compositions according to the invention can also be employed in plasticized formulations, although, in this case, the problem of the length of the working range when heated is less acute than in the case of the rigid or semirigid formulations.

The incorporation of the various stabilizers or adjuvants is usually carried out using the chlorinated polymer in powder form.

A mixture of two or more of the compounds comprising the compositions according to the invention can, of course, be prepared before they are incorporated into the chlorinated polymer.

All of the usual methods for incorporating the various stabilizers or adjuvants into the polymer can be employed. For example, the homogenization of the polymeric composition may be carried out in a blender or on a roll mill, at a temperature such that the composition becomes fluid, normally between 150° C. and 200° C. in the case of PVC and for a sufficient period of time, on the order of a few minutes to a few tens of minutes.

The chlorinated polymer, and more particularly PVC compositions, may be processed according to any of the techniques usually employed in the art such as, for example, extrusion, injection, extrusion-blow molding, calendering or rotational molding.

In order to further illustrate the present invention and the advantages thereof, the following specific examples are given, it being understood that same are intended only as illustrative and in nowise limitative.

EXAMPLES 1 and 2 and COMPARATIVE EXAMPLES

The following base composition A was prepared:

| | |
|---|---|
| (i) PVC powder prepared by polymerization or suspension and marketed under the trademark Lacqvyl SO 71 S (viscosity index according to NF standard T 51013:80) | 1,000 g |
| (ii) impact strengthener (butadiene/styrene methyl methacrylate copolymer | 80 g |
| (iii) lubricant based on rosin ester (wax E) | 5 g |
| (iv) epoxidized soya oil | 40 g |
| (v) calcium stearate | 3 g |
| (vi) zinc stearate | 3 g |

After homogenization in a fast blender, cold, 10 fractions of this composition A were withdrawn. To each fraction was added an amount of stearoylbenzoylmethane or of sodium (invention), lithium, potassium or calcium (comparative examples) derivative of stearoylbenzoylmethane. The amounts by weight per 100 g of PVC are reported in Table I below; these amounts were calculated such that each composition contained the same molar amount of stearoylbenzoylmethane.

1-mm thick sheets were prepared from the various compositions thus obtained, and from the unmodified composition A, by blending on a 2-roll mill for 4 min at 180° C.

Using test specimens (approximately 1 cm × 2 cm) cut from these sheets, a heat aging test was carried out in a ventilated oven at 180° C. and the change in the Gardner color was monitored as a function of time.

The Gardner color values measured for different aging periods and the period before complete blackening of the tested samples are reported in Table I.

Inspection of the results evidenced that the sodium derivative of stearoylbenzoylmethane was the only metal derivative which slowed the development of yellowing more efficiently than free stearoylbenzoylmethane.

TABLE I

| TESTS | β-DIKETONIC STABILIZERS | | GARDNER VALUES AS A FUNCTION OF TIME IN MINUTES | | | | | | | | |
|---|---|---|---|---|---|---|---|---|---|---|---|
| | Nature | weight in g/100 g PVC | 0 | 10 | 20 | 27 | 35 | 42 | 50 | 57 | Black at |
| Control | none | — | 4 | 6 | 6 | 6 | 6 | 7 | 9 | 9 | 65 min |
| Example 1 | SBM.Na | 0.212 | 0 | 0 | 1 | 2 | 3 | 5 | 6 | 8 | 73 min |
| Test A1 | SBM* | 0.200 | 0 | 0 | 1 | 3 | 5 | 6 | 9 | black edges | 59 min |
| Test A2 | SBM.Li | 0.202 | 0 | 0 | 1.5 | 3 | 8 | 10 | 11 | 12 | >80 min |
| Test A3 | SBM.K | 0.220 | 0 | 0 | 1 | 3 | 5 | 12 | 14 | 16 | >80 min |
| Test A4 | SBM.Ca | 0.210 | 0 | 0 | 1 | 3.5 | 6 | 7 | 9 | 11 | >80 min |
| Example 2 | SBM.Na | 0.424 | 0 | 0 | 1 | 2 | 2.5 | 3.5 | 5 | 6 | 78 min |
| Test A5 | SBM* | 0.400 | 0 | 0 | 1 | 2 | 4 | 7 | 10 | — | 55 min |
| Test A6 | SBM.Li | 0.404 | 0 | 0 | 1 | 3 | 5 | 7 | 10 | 11 | >80 min |
| Test A7 | SBM.K | 0.440 | 0 | 0 | 1 | 3 | 4 | 11 | 14 | 16 | >80 min |

TABLE I-continued

| TESTS | β-DIKETONIC STABILIZERS Nature | weight in g/100 g PVC | GARDNER VALUES AS A FUNCTION OF TIME IN MINUTES | | | | | | | | Black at |
|---|---|---|---|---|---|---|---|---|---|---|---|
| | | | 0 | 10 | 20 | 27 | 35 | 42 | 50 | 57 | |
| Test A8 | SBM.Ca | 0.420 | 0 | 0 | 1 | 3 | 5 | 7 | 10 | 11 | >80 min |

*SBM = stearoylbenzoylmethane

EXAMPLES 3 and 4 and COMPARATIVE EXAMPLES

The following base composition B was prepared:

butanoylmethane was the only metal derivative which slowed the development of yellowing more efficiently than free dibenzoylmethane of benzoyl-3-methylbutanoylmethane.

TABLE II

| TESTS | β-DIKETONIC STABILIZERS Nature | weight in g/100 g PVC | GARDNER VALUES AS A FUNCTION OF TIME IN MINUTES | | | | | | | | Black at |
|---|---|---|---|---|---|---|---|---|---|---|---|
| | | | 0 | 10 | 20 | 27 | 35 | 42 | 50 | 57 | |
| Control | none | — | 4 | 6 | 6 | 6 | 6 | 7 | 9 | 9 | 65 min |
| Example 3 | DBM.Na | 0.220 | 0.5 | 1.5 | 2 | 2.5 | 3 | 4 | 5 | 7 | 85 min |
| Test B1 | DBM* | 0.200 | 0.5 | 1.5 | 3 | 3.5 | 4 | 6 | 7 | black edges | 60 min |
| Test B2 | DBM.Li | 0.205 | 0.5 | 1.5 | 3 | 4 | 11 | 12 | 12 | 14 | >90 min |
| Test B3 | DBM.K | 0.234 | 0.5 | 1.5 | 2 | 3.5 | 12 | 14 | 14 | 16 | >90 min |
| Test B4 | DBM.Ca | 0.218 | 0.5 | 1.5 | 2 | 2.5 | 4 | 6 | 7 | 8 | >90 min |
| Example 4 | BMBM.Na | 0.223 | 0 | 0 | 0.5 | 1 | 2 | 3 | 4 | 7 | 85 min |
| Test B5 | BMBM* | 0.200 | 0 | 0 | 0.5 | 2 | 4 | 5 | 6 | 9 | 67 min |
| Test B6 | BMBM.Li | 0.206 | 0 | 0 | 0.5 | 2 | 6 | 8 | 10 | 11 | >90 min |
| Test B7 | BMBM.K | 0.240 | 0 | 0.5 | 1 | 2.5 | 5 | 11 | 13 | 15 | >90 min |
| Test B8 | BMBM.Ca | 0.220 | 0 | 0 | 0.5 | 2.5 | 4.5 | 6 | 9 | 9 | >90 min |

*DBM = dibenzoylmethane
**BMBM = benzoyl-3-methylbutanoylmethane

| | |
|---|---|
| (i) PVC powder prepared by polymerization or suspension and marketed under the trademark Lacqvyl SO 71 S (viscosity index according to NF standard T 51013:80) | 1,000 g |
| (ii) impact strengthener (butadiene/ styrene methyl methacrylate copolymer) | 80 g |
| (iii) lubricant based on rosin ester (wax E) | 5 g |
| (iv) epoxidized soya oil | 40 g |
| (v) calcium para-tert-butylbenzoate | 4 g |
| (vi) zinc stearate | 3 g |

After homogenization in a fast blender, cold, 10 fractions of this composition B were withdrawn. To each fraction was added an amount of dibenzoylmethane or of benzoyl-3-methylbutanoylmethane or of sodium (invention), lithium, potassium or calcium (comparative examples) derivative of dibenzoylmethane or of benzoyl-3-methylbutanoylmethane. The amounts by weight per 100 g of PVC are reported in Table II below; these amounts were calculated such that each composition of each of the series contained the same molar amount of dibenzoylmethane or of benzoyl-3-methylbutanoylmethane.

1-mm thick sheets were prepared from the various compositions thus obtained, and from the unmodified composition B, by blending on a 2-roll mill for 4 min at 180° C.

Using test specimens (approximately 1 cm × 2 cm) cut from these sheets, a thermal aging test was carried out in a ventilated oven at 180° C. and the change in the Gardner color was monitored as a function of time.

The Gardner color values measured for different aging periods and the period before complete blackening of the tested samples are reported in Table II.

Inspection of the results evidenced that the sodium derivative of dibenzoylmethane or benzoyl-3-methyl- While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter which comprises a chlorinated base polymer comprising a vinyl chloride monomer, a vinylidene chloride monomer a mixture thereof (a) an effective stabilizing amount of at least one organozinc compound, (b) an effective stabilizing amount of at least one organic calcium, barium, magnesium or strontium compound, and (c) an effective stabilizing amount of at least one sodium β-diketonate.

2. The chlorinated polymer composition as defined by claim 1, said at least one organozinc compound comprising a zinc carboxylate or phenolate.

3. The chlorinated polymer composition as defined by claim 1, said at least one organozinc compound comprising a zinc salt of maleic, acetic, diacetic, propionic, hexanoic, 2-ethylhexanoic, decanoic, undecanoic, lauric, myristic, palmitic, stearic, oleic, ricinoleic, behenic, hydroxystearic, hydroxyundecanoic, benzoic, phenylacetic, para-tert-butylbenzoic or salicylic acid or a zinc phenolate of phenol or a phenol substituted by one or more alkyl radicals.

4. The chlorinated polymer composition as defined by claim 1, comprising from 0.005% to 1% by weight of said at least one organozinc compound relative to the weight of said chlorinated polymer.

5. The chlorinated polymer composition as defined by claim 4, comprising from 0.01% to 0.6% by weight of said at least one organozinc compound relative to the weight of said chlorinated polymer.

6. The chlorinated polymer composition as defined by claim 1, said at least one organic calcium, barium, magnesium or strontium compound comprising a carboxylate or phenolate.

7. The chlorinated polymer composition as defined by claim 1, said at least one organic calcium, barium, magnesium or strontium compound comprising a calcium, barium, magnesium or strontium salt of maleic, acetic, diacetic, propionic, hexanoic, 2-ethylhexanoic, decanoic, undecanoic, lauric, myristic, palmitic, stearic, oleic, ricinoleic, behenic, hydroxystearic, hydroxyundecanoic, benzoic, phenylacetic, para-tert-butylbenzoic or salicylic acid, or a calcium, barium, magnesium or strontium phenolate of phenol or a phenol substituted by one or more alkyl radicals.

8. The chlorinated polymer composition as defined by claim 1, comprising from 0.005% to 5% by weight of said at least one organic calcium, barium, magnesium or strontium compound relative to the weight of said chlorinated polymer.

9. The chlorinated polymer composition as defined by claim 8, comprising from 0.02% to 2% by weight of said at least one organic calcium, barium, magnesium or strontium compound relative to the weight of said chlorinated polymer.

10. The chlorinated polymer composition as defined by claim 1, said at least one sodium $\beta$-diketonate comprising a sodium derivative of an aromatic, arylaliphatic, aliphatic or cyclic $\beta$-diketone or $\beta$-ketoaldehyde.

11. The chlorinated polymer composition as defined by claim 1, said at least one sodium $\beta$-diketonate comprising a sodium derivative of benzoylstearoylmethane, dibenzoylmethane, benzoylacetone, benzoyl-3methylbutanoylmethane, or methoxycarbonylbenzoylbenzoylmethanes, or a bis-$\beta$-diketone.

12. The chlorinated polymer composition as defined by claim 1, comprising from 0.005% to 5% by weight of said at least one sodium $\beta$-diketonate relative to the weight of said chlorinated polymer.

13. The chlorinated polymer composition as defined by claim 12, comprising from 0.01% to 2% by weight of said at least one sodium $\beta$-diketonate relative to the weight of said chlorinated polymer.

14. The chlorinated polymer composition as defined by claim 1, further comprising a free $\beta$-diketone.

15. The chlorinated polymer composition as defined by claim 1, further comprising a polyol having a boiling point above 150° C., in a proportion of from 0.005% to 1% by weight relative to the weight of said chlorinated polymer.

16. The chlorinated polymer composition as defined by claim 15, said polyol comprising trimethylolpropane, glycerol, 1,2,6-hexanetriol, 1,2,4-butanetriol or trishydroxyethyl isocyanurate, pentaerythritol or diglycerol, xylitol or tetramethylolcyclohexanol, mannitol, sorbitol or dipentaerythritol, a polyol partially esterified with a carboxylic acid and having at least three free hydroxyl functional groups, or a polyvinyl alcohol, having a viscosity ranging from approximately $4 \times 10^{-3}$ Pa.s to $60 \times 10^{-3}$ Pa.s at 20° C. in an aqueous solution at a concentration of 4% by weight.

17. The chlorinated polymer composition as defined by claim 1, further comprising a trialkyl, alkylphenyl, or triphenyl phosphite in an amount ranging from 0.05% to 5% by weight relative to the weight of said chlorinated polymer.

18. The chlorinated polymer composition as defined by claim 1, further comprising an epoxidized polyglyceride.

19. The chlorinated polymer composition as defined by claim 18, said epoxidized polyglyceride comprising epoxidized soya oil, epoxidized linseed oil, epoxidized fish oil or epoxidized tall oil.

20. The chlorinated polymer composition as defined by claim 1, said chlorinated polymer comprising polyvinyl chloride, polyvinylidene chloride, or copolymer or mixture thereof.

21. The chlorinated polymer composition as defined by claim 20, said chlorinated polymer comprising polyvinyl chloride.

* * * * *